United States Patent
Koizumi et al.

(10) Patent No.: US 8,120,682 B2
(45) Date of Patent: Feb. 21, 2012

(54) SOLID-STATE IMAGE PICKUP DEVICE AND METHOD OF RESETTING THE SAME

(75) Inventors: Toru Koizumi, Yokohama (JP);
Shigetoshi Sugawa, Atsugi (JP);
Tetsunobu Kochi, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 53 days.

(21) Appl. No.: 12/539,782

(22) Filed: Aug. 12, 2009

(65) Prior Publication Data

US 2009/0295974 A1    Dec. 3, 2009

Related U.S. Application Data

(62) Division of application No. 11/272,704, filed on Nov. 15, 2005, now abandoned, which is a division of application No. 09/430,023, filed on Oct. 29, 1999, now Pat. No. 7,015,964.

(30) Foreign Application Priority Data

Nov. 2, 1998   (JP) ..................... 10-312281

(51) Int. Cl.
*H04N 3/14*      (2006.01)
*H04N 5/335*     (2011.01)

(52) U.S. Cl. ........ 348/294; 348/298; 348/302; 348/308; 348/312

(58) Field of Classification Search ........... 348/294, 348/298, 302, 308, 312; 250/208.1; 257/290–292
See application file for complete search history.

(56) References Cited

U.S. PATENT DOCUMENTS

| 4,835,404 | A |   | 5/1989  | Sugawa et al. |
| 4,879,470 | A |   | 11/1989 | Sugawa et al. |
| 4,967,067 | A |   | 10/1990 | Hashimoto et al. |
| 4,972,243 | A |   | 11/1990 | Sugawa et al. |
| 4,985,775 | A | * | 1/1991  | Murayama et al. ........... 348/314 |
| 5,105,277 | A |   | 4/1992  | Hayes et al. |
| RE34,309  | E |   | 7/1993  | Tanaka et al. |
| 5,233,428 | A |   | 8/1993  | Alford et al. |
| 5,541,654 | A |   | 7/1996  | Roberts |
| 5,719,626 | A |   | 2/1998  | Yoneyama et al. |

(Continued)

FOREIGN PATENT DOCUMENTS

EP     0 738 010 A2    10/1996

(Continued)

OTHER PUBLICATIONS

Communication from European Patent Office in Application No. 99 308 612.3-1241, dated Nov. 7, 2005.

(Continued)

*Primary Examiner* — Yogesh Aggarwal
(74) *Attorney, Agent, or Firm* — Fitzpatrick, Cella, Harper & Scinto

(57) ABSTRACT

A solid-state image pickup device comprises for each pixel a photoelectric converter PD, an input terminal FD of a signal amplifier and a transfer switch TX for transferring an optical signal from the photoelectric converter to the input terminal. The device additionally comprises means for resetting the photoelectric converter by opening the transfer switch TX under a condition of holding the voltage of the input terminal FD to a fixed high level before storing the optical signal in the photoelectric converter PD. With this arrangement, any residual electric charge in the photoelectric converter can be eliminated without paying the cost of reducing the manufacturing yield and degrading the chip performance.

3 Claims, 14 Drawing Sheets

U.S. PATENT DOCUMENTS

| | | | |
|---|---|---|---|
| 5,861,620 A | 1/1999 | Takahashi et al. | |
| 5,942,774 A | 8/1999 | Isogal et al. | |
| 5,955,753 A | 9/1999 | Takahashi | |
| 5,959,669 A | 9/1999 | Mizoguchi et al. | |
| 5,986,297 A * | 11/1999 | Guidash et al. | 257/223 |
| 6,002,287 A | 12/1999 | Ueno et al. | |
| 6,046,446 A | 4/2000 | Kameshima et al. | |
| 6,064,431 A | 5/2000 | Ueno | |
| 6,118,115 A | 9/2000 | Kozuka et al. | |
| 6,130,712 A | 10/2000 | Miyazaki et al. | |
| 6,369,853 B1 | 4/2002 | Merrill et al. | |
| 6,377,303 B2 * | 4/2002 | O'Connor | 348/308 |
| 6,377,304 B1 | 4/2002 | Saitoh | |
| 6,510,193 B1 | 1/2003 | Kochi et al. | |
| 6,515,701 B2 | 2/2003 | Clark et al. | |
| 6,567,571 B1 | 5/2003 | Kochi et al. | |
| 6,587,603 B1 | 7/2003 | Sakurai et al. | |
| 6,633,334 B1 | 10/2003 | Sakurai et al. | |
| 6,650,369 B2 | 11/2003 | Koizumi et al. | |
| 6,697,111 B1 * | 2/2004 | Kozlowski et al. | 348/302 |
| 6,757,016 B1 | 6/2004 | Ueno et al. | |
| 6,831,685 B1 | 12/2004 | Ueno et al. | |
| 6,839,084 B1 | 1/2005 | Hiyama et al. | |
| 6,850,278 B1 | 2/2005 | Sakurai et al. | |
| 6,963,372 B1 | 11/2005 | Hiyama et al. | |
| 7,129,985 B1 | 10/2006 | Koizumi et al. | |
| 7,142,233 B1 | 11/2006 | Ogawa et al. | |
| 7,221,397 B1 | 5/2007 | Kochi | |

FOREIGN PATENT DOCUMENTS

| | | |
|---|---|---|
| EP | 0 809 303 A1 | 11/1997 |
| EP | 0 854 516 A2 | 7/1998 |
| JP | 7-105915 | 4/1995 |
| JP | H09-252434 A | 9/1997 |
| WO | 98/20561 | 5/1998 |

OTHER PUBLICATIONS

O. Yadid-Pecht, et al., "CMOS Active Pixel Sensor Star Tracker with Regional Electronic Shutter", IEEE Journal of Solid-State Circuits, vol. 32, No. 2, Feb. 1997, pp. 285-288.

European Office Action dated Jan. 20, 2011, from corresponding European Application No. 99308612.3.

* cited by examiner

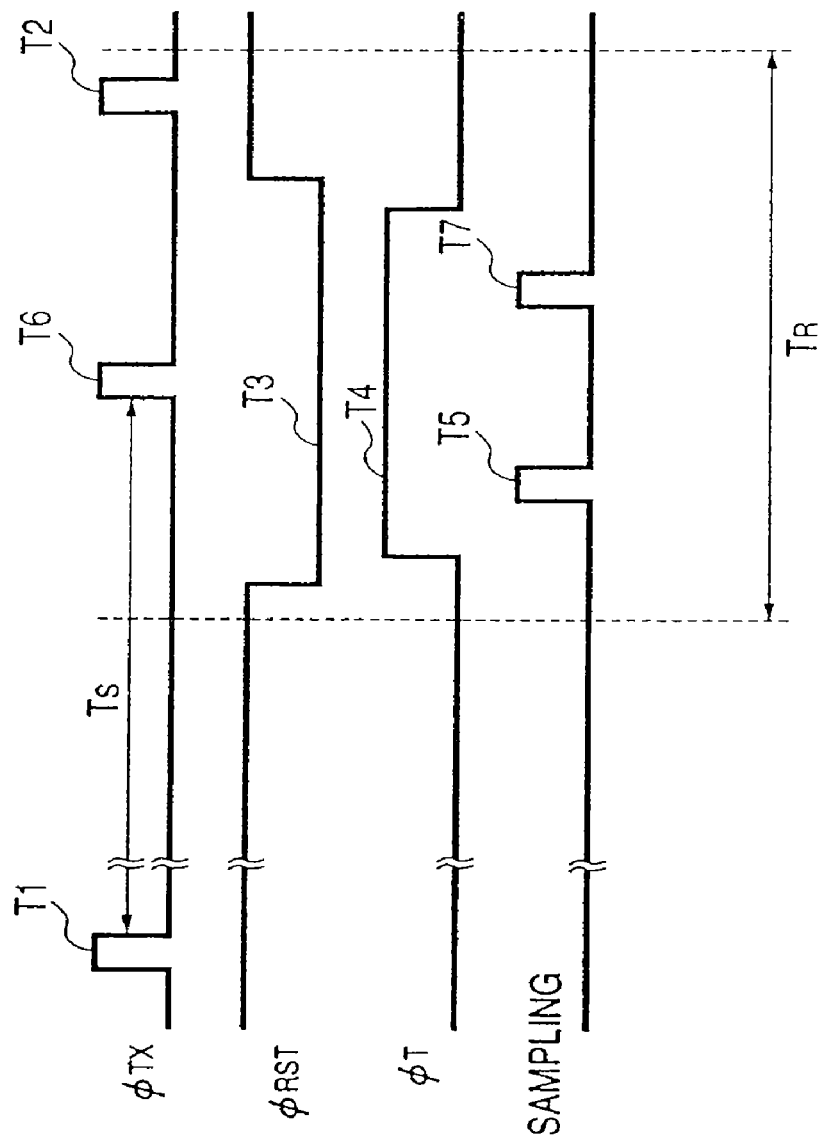

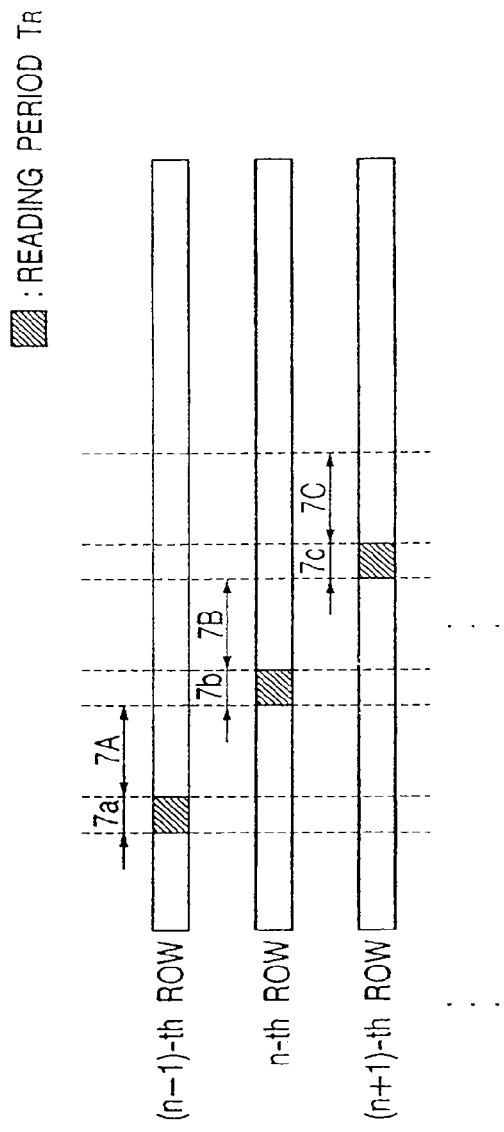
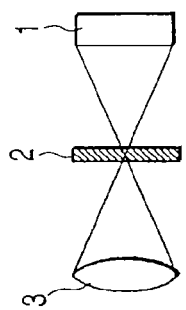

SOLID-STATE IMAGE PICKUP DEVICE AND METHOD OF RESETTING THE SAME

This is a divisional of U.S. patent application Ser. No. 11/272,704, filed Nov. 15, 2005. which is a divisional of U.S. patent application Ser. No. 09/430,023, now U.S. Pat. No. 7,015,964.

BACKGROUND OF THE INVENTION

1. Field of the Invention

This invention relates to a solid-state image pickup device to be used for an image input apparatus such as a digital camera, a video camera, an image scanner or an AF sensor and also to a method of resetting the same.

2. Related Background Art

Typical examples of solid-state image pickup device include the CCD image sensor and the non-CCD image sensor. The former comprises a photoelectric converter having photodiodes and a CCD shift register, whereas the latter comprises a photoelectric converter having photodiodes or phototransistors and a scanning circuit having MOS transistors.

The APS (active pixel sensor) is a type of non-CCD image sensor comprising a photodiode and MOS transistors.

More specifically, an APS comprises combinations of a photodiode, a MOS switch and an amplifier for amplifying the signal from the photodiode, each combination being arranged in correspondence to a pixel, and provides a number of advantages including the capabilities of "XY addressing" and "realizing the sensor and the signal processing circuit in a single chip". On the other hand, it is rather difficult for an APS to reduce the chip size that is a determinant of the dimensions of its optical system because of the large number of elements it has for each pixel. This is the reason why the market for solid-state image pickup devices has been dominated by conventional CCD image sensors to date.

However, in recent years, due to the technological development for miniaturizing MOS transistors and the strong demand for "realizing the sensor and the signal processing circuit in a single chip" and "reducing the power consumption rate of the image sensor for the purpose of power saving", the APS has been attracting attention as it is also called a CMOS sensor.

FIG. 23 of the accompanying drawings schematically illustrates the pixel section of a known APS and its operation.

Referring to FIG. 23, photoelectric converter PD is a buried type photodiode similar to the one typically used in a CCD. With a buried type photodiode, the dark current that can be generated on the $SiO_2$ surface can be suppressed by arranging a $p^+$-layer containing an impurity to a high concentration level on the surface and the saturation charge of the photodiode can be raised by the junction capacitance generated between the n-layer of the storage portion and the $p^+$-layer of the surface. It operates in a manner as described below. Firstly, diffusion region FD is reset to a reference voltage by applying an on-pulse to gate RST. Thereafter, an off-pulse is applied to the gate RST to bring the diffusion region into a floating state in order to start storing data. After a certain period of time, another on-pulse is applied to gate TX to read the charge of the optical signal stored in the photoelectric converter PD to floating diffusion region FD, which is the input terminal of the amplifier of the APS, by way of MOS transfer section TX. Then, the signal charge $Q_{sig}$ is converted into voltage $Q_{sig}/C_{FD}$ by means of the capacitance $C_{FD}$ of the floating diffusion region FD and the signal is red by way of a source-follower circuit that uses the floating diffusion region FD as its input terminal.

When a reverse bias voltage is applied to a buried type photodiode, depletion layers extend from the PN junction at the interface with the surface $p^+$-layer and from the PN junction at the interface with the P-type well PWL perpendicularly into the n-layer. At this time, the number of electrons in the n-layer of the photodiode is substantially equal to that of the neutral region located between the two depletion layers and it is reduced in proportion to the width of the depletion layers. The number of electrons of said neutral region when the reverse bias voltage is 0 volt corresponds to the saturation charge $Q_{sat}$. As the both depletion layers extend to contact each other by the reverse bias voltage, the inside of the photodiode is completely depleted to make the neutral region non-existent. The reverse bias voltage for making the neutral region non-existent will be referred to as depletion voltage $V_{dp}$ in the following description.

If a reverse bias voltage greater than the depletion voltage is applied, the electron concentration of the n-layer of the photodiode decreases as an exponential function of the reverse bias voltage.

When the n-layer of the photodiode of an APS having a configuration as described above is depleted, the electric charge generated by light is almost totally transferred to the floating diffusion region FD to reset the electron state in the photodiode. A mode of transferring almost all the electric charge of the photodiode is referred to as depletion transfer hereinafter.

FIG. 24 of the accompanying drawings shows the relationship between the saturation charge of a photodiode and the voltage of the floating diffusion region FD upon reading the saturation charge and also the relationship between the saturation charge of the photodiode and the depletion voltage Z. Then, the voltage $V_{FDSat}$ of the floating diffusion region FD is expressed by the formula below:

$$V_{FDsat} = V_{res} - Q_{sat}/C_{FD}$$

where $V_{res}$ is the reset voltage, $Q_{sat}$ is the saturation charge of the photodiode and $C_{FD}$ is the capacitance of the floating diffusion region.

Generally, the saturation charge of a photodiode has to be higher than the level of realizing a desired sensitivity, which may be A in FIG. 24. For realizing a depletion transfer, on the other hand, the requirement of $$V_{FDsat} > V_{dp}$$

has to be met, provided that $V_{dp}$ is the depletion voltage of the photodiode, which is indicated by B in FIG. 24. If $V_{FDsat} < V_{dp}$, the reverse bias voltage of the photodiode will become the voltage of the floating diffusion region to leave a neutral region within the photodiode and hence the signal voltage will be read out in accordance with the capacitance division between the capacitance attributable to the both depletion layers and the capacitance of the floating diffusion region. At the same time, electrons will remain in the photodiode by an amount equal to the saturation charge $Q_{sat}$ after the reading operation so that they can give rise to a residual image and a noise.

As described above, in the known APS, the saturation charge $Q_{sat}$ of the photodiode is made to meet the requirement of $A < Q_{sat} < B$ so as to be found within the interval of C in FIG. 24.

However, the saturation charge $Q_{sat}$ or the depletion voltage $V_{dp}$ is apt to be affected by variances of the manufacturing process. For instance, the depletion voltage can be shifted by 0.4 volt when the dose of ion implantation for forming the n-layer of the photodiode is varied by 10%.

Then, the net result is a low manufacturing yield.

SUMMARY OF THE INVENTION

Therefore, it is an object of the present invention to provide a solid-state image pickup device that can effectively reduce the residual charge in the photoelectric converter and operate effectively and efficiently for photoelectric conversion and also a method of resetting the same.

Another object of the present invention is to expand the process tolerance for manufacturing a solid-state image pickup device that is adapted to be reset in a desired manner.

According to the invention, the above objects and other objects of the invention are achieved by providing a solid-state image pickup device comprising a photoelectric converter, an input terminal for signal amplifier, a transfer switch for transferring an electric charge from the photoelectric converter to the input terminal and a reset switch for applying a reset voltage to the input terminal, wherein said device is adapted to input a pulse signal to the reset switch and the transfer switch in order to turn on said reset switch and said transfer switch simultaneously.

BRIEF DESCRIPTION OF THE DRAWINGS

FIG. 11 is a drive timing chart illustrating the operation of the preferred embodiment of solid-state image pickup device according to the invention.

FIG. 12 is another drive timing chart that can be used for the operation of the preferred embodiment of solid-state image pickup device according to the invention.

FIG. 13 is a schematic illustration of an image input apparatus that can be realized by using a solid-state image pickup device according to the invention.

DETAILED DESCRIPTION OF THE PREFERRED EMBODIMENTS

Now, the present invention will be described in greater detail by referring to the accompanying drawings that illustrate preferred embodiments of the invention.

Embodiment 1

Figure 1:
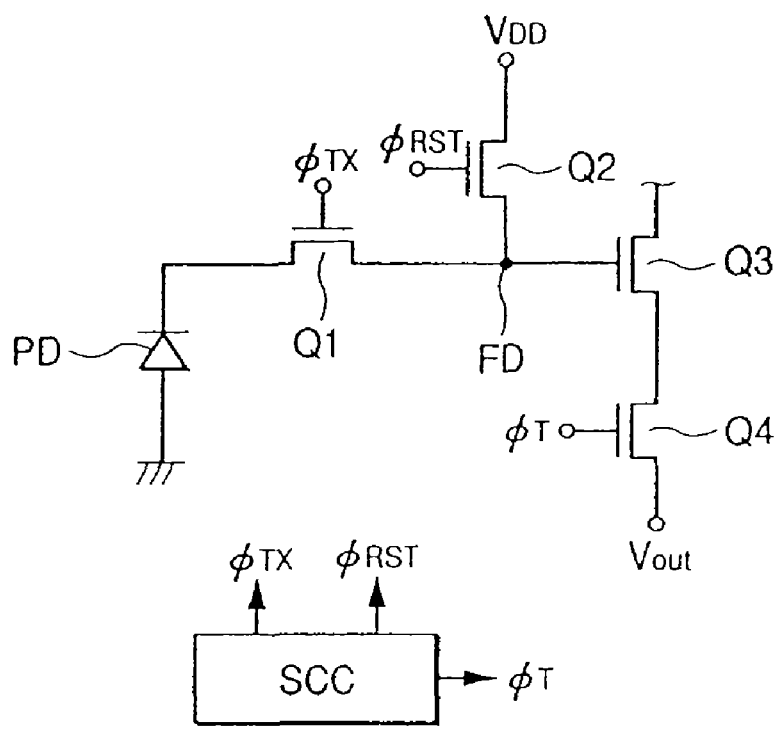
FIG. 1 is a schematic circuit diagram of a preferred embodiment of solid-state image pickup device according to the invention.
Figure 2:
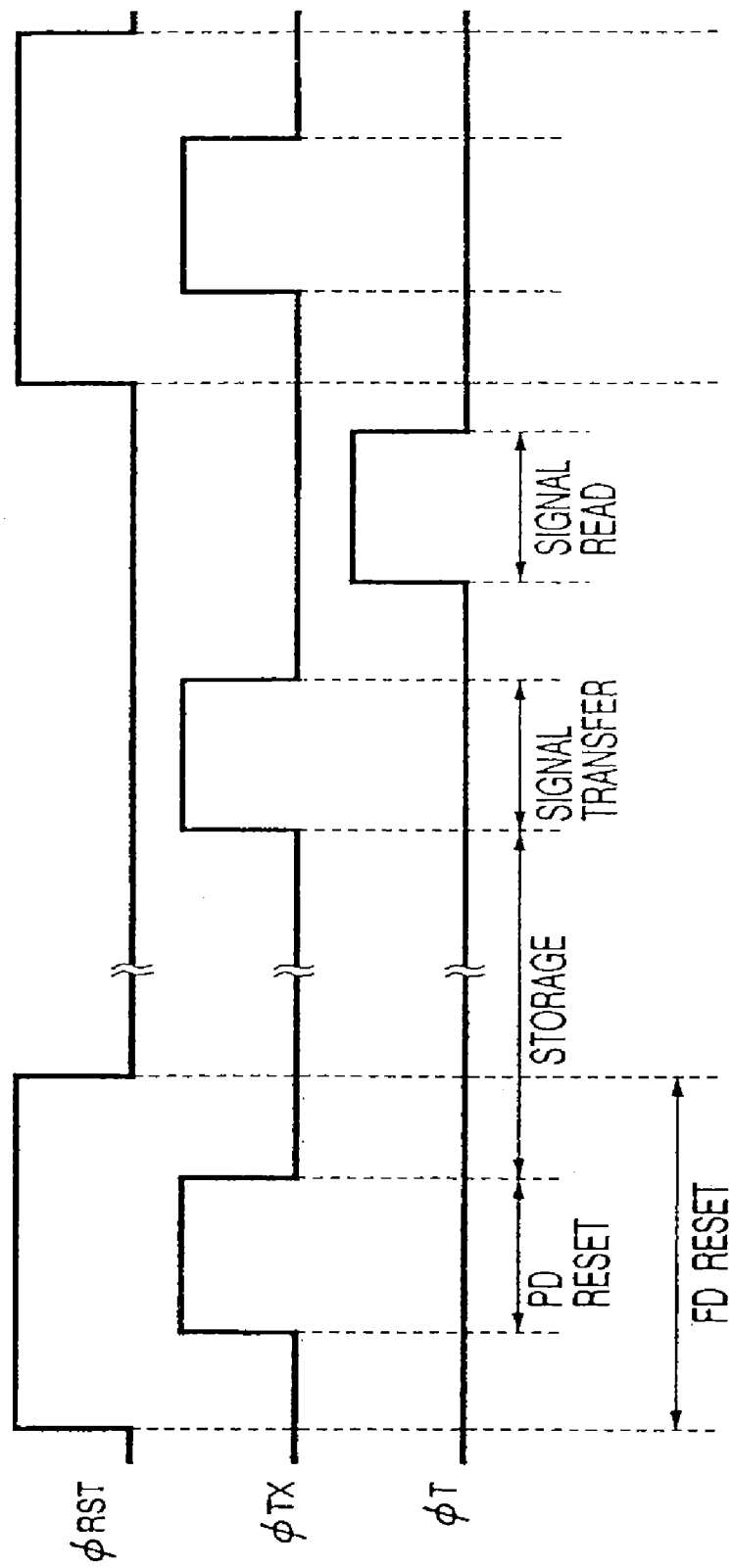
FIG. 2 is a drive timing chart illustrating the operation of the preferred embodiment of solid-state image pickup device according to the invention.

FIG. 1 is a schematic circuit diagram of a pixel of a preferred embodiment of solid-state image pickup device according to the invention and FIG. 2 is a drive timing chart illustrating the operation of the preferred embodiment of solid-state image pickup device according to the invention. Note that the basic configuration of this embodiment is commonly applicable to the remaining embodiments as will be described hereinafter.

The photoelectric converter PD typically comprises a photodiode having a PN junction or a PIN junction. One of the terminals of the photoelectric converter is held to a reference potential for applying a reverse bias voltage, while the other terminal thereof is connected to a transfer switch Q1. From FIG. 1, it will be seen that the cathode is connected to the transfer switch Q1 to transfer electrons.

In FIG. 1, Q2 denotes a reset switch having one of its terminals connected to reference voltage source VDD for applying a resetting voltage.

Q3 denotes a transistor operating as amplifier for outputting a signal obtained by amplifying the signal input to the gate that operates as input terminal.

Q4 denotes a selection switch for selecting a pixel from which a signal is to be read out.

A pulse signal as shown in FIG. 2 is applied to the gate of each of the switches from a control circuit SCC.

Figure 3:
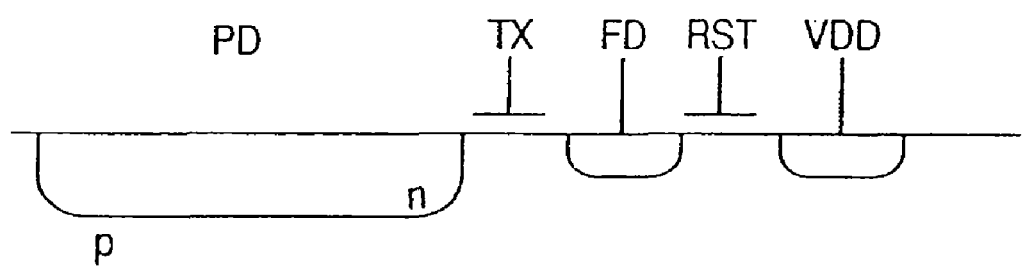
FIG. 3 is a schematic cross sectional view of a principal portion of the preferred embodiment of solid-state image pickup device according to the invention.
Figure 4:
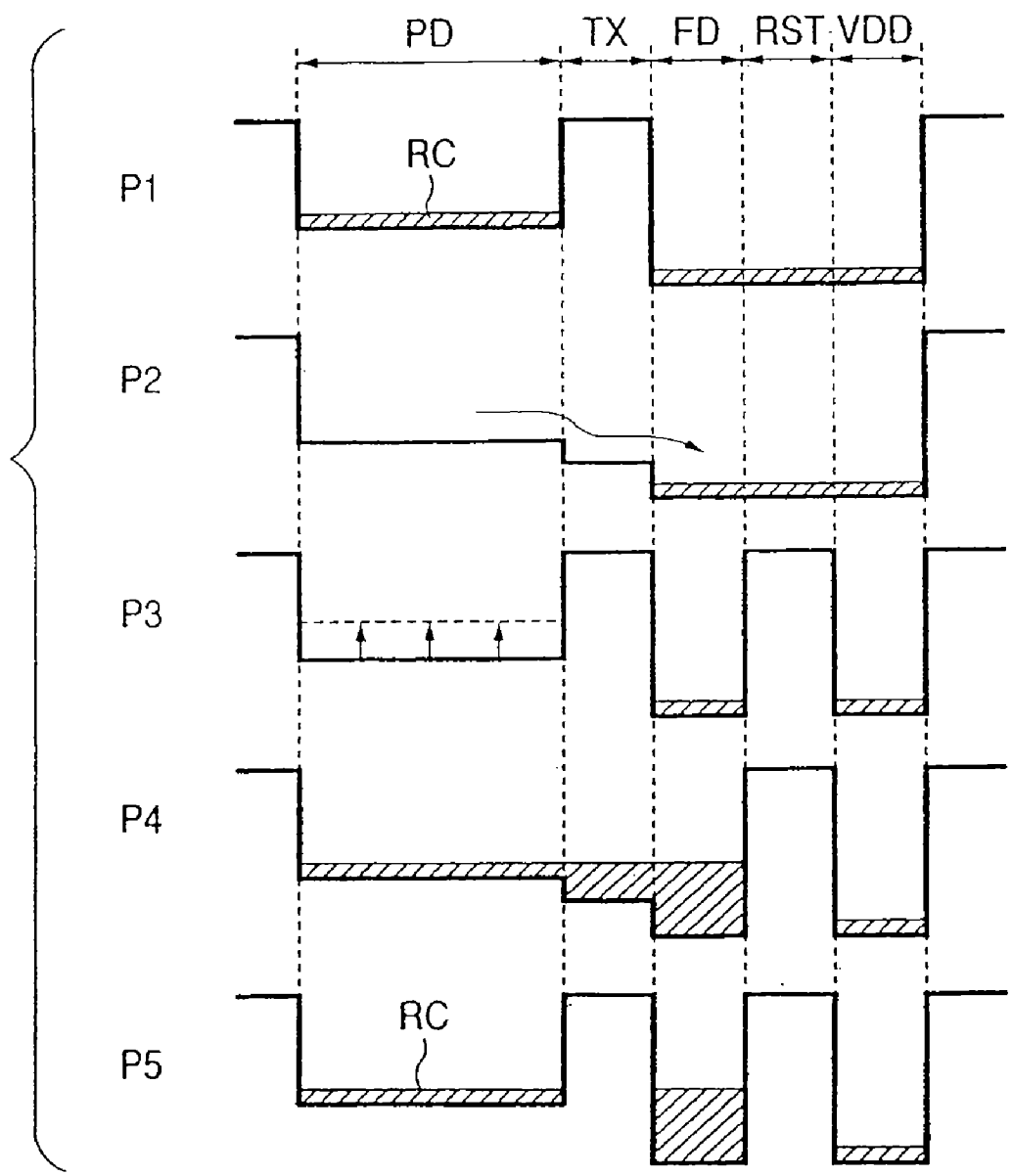
FIG. 4 is a schematic illustration of changes that can take place in the potential profiles of principal sections of the preferred embodiment of solid-state image pickup device according to the invention.

FIG. 3 is a schematic cross sectional view of the semiconductor chip incorporating part of the circuit of FIG. 1 and FIG. 4 is a schematic illustration of changes that can take place in the potential profiles of principal sections of the embodiment. In FIGS. 3 and 4, TX denotes the potential energy under the gate of the transfer switch and RST denotes the potential energy under the gate of the reset switch.

The n-type semiconductor layer of the photoelectric converter PD is held in common with one of the main electrodes of the MOS transistor of the transfer switch Q1 and the other main electrode of the transfer switch Q1 also operates as floating diffusion region FD, which will operate as input terminal of the amplifier.

The reset switch Q2 comprises a MOS transistor having a pair of main electrodes, which are the floating diffusion region FD and the semiconductor region to which the reference voltage VDD is applied for resetting.

The floating diffusion region FD is connected to the gate of the transistor Q3, although the transistors Q3 and the selection switch Q4 are not shown in FIG. 3.

FIG. 2 and FIG. 4 illustrate how the embodiment of FIG. 1 operates. Firstly, the diffusion region FD is reset to the reference voltage by inputting a high level pulse such as φRST to the gate of the reset switch Q2. P1 in FIG. 4 shows the potential profile that will be observed at this time.

Then, the photoelectric converter PD is reset by inputting a high level pulse such as φTX to the gate of the transfer switch Q1. Since the reset switch Q2 is held on at this time, the potential profile will be such as the one indicated by P2 at this time so that the electric charge will be completely transferred to the diffusion region FD.

Subsequently, the transfer switch Q1 is turned off to isolate the photoelectric converter PD and the diffusion region FD from each other. Then, since any residual electric charge of the photoelectric converter PD has been completely transferred to the diffusion region FD, the n-layer of the photoelectric converter PD will be completely depleted.

As the transfer switch Q1 is turned off, the photoelectric converter PD starts storing a photoelectric charge.

Thereafter, the reset switch Q2 is turned off. Then, the potential profile will be such as the one indicated by P3 in FIG. 4.

After storing the electric charge for a certain period of time, the transfer switch Q1 is turned on once again to transfer the electric charge stored in the photoelectric converter to the floating diffusion region FD. P4 in FIG. 4 indicates the potential profile that will be observed at this time.

Then, after turning off the transfer switch Q1, selection pulse φT is input to the gate of the selection switch Q4 and the signal amplified by the transistor Q3 is read out.

P5 in FIG. 4 indicates the potential profile that will be observed after turning off the transfer switch Q1.

Any residual electric charge remaining in the photoelectric converter PD will be removed by carrying out the above resetting operation for another time.

In this embodiment, a reverse bias voltage higher than the depletion voltage is selected as reference voltage VDD to be used for resetting operations and the transfer switch Q1 is turned on while applying this voltage to the diffusion region FD by way of the reset switch Q2.

Figure 5:
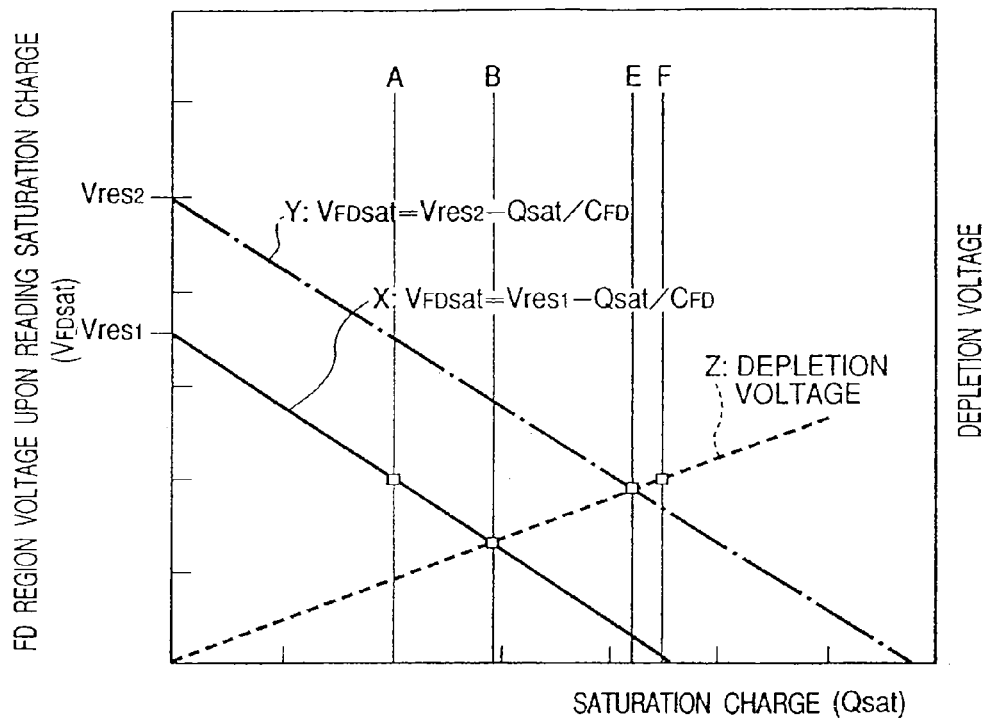
FIG. 5 is a graph showing the dependency of the voltage of the floating diffusion region on the saturation charge, illustrating the reset voltage necessary for depleting the photoelectric converter of the preferred embodiment of solid-state image pickup device according to the invention.

In this way, a reverse bias voltage higher than the depletion voltage is applied to the photodiode to sufficiently reduce the residual electric charge in the photodiode. If the saturation charge $Q_{sat}$ of the photodiode is found between B and F in FIG. 5 and the transfer switch of the prior art is turned on while an electric charge corresponding to the saturation charge is stored in the photodiode, a large electric charge exists in the photodiode because $V_{FDSat} < V_{dp}$. If the transfer switch Q1 is turned off to enter the next storage period and the signal charge is read out under this condition, the residual electric charge that is not read out in the last reading period will be added to the signal charge read out this time.

To the contrary, according to the invention, the electric potential of the diffusion region FD is held to a level that is sufficiently high for applying a reverse bias voltage higher than the depletion voltage $V_{dp}$ to the photodiode and then any electric charge remaining in the photodiode is eliminated to reset the latter by turning on the transfer switch.

As a result, no depletion transfer operation is required for the electric charge of the photodiode at the time of signal transfer so that, unlike the prior art, no problem of residual image occurs under the condition of $$V_{FDsat} = V_{res1} - Q_{sat}/C_{FD} < V_{dP}.$$

Therefore, the saturation charge $Q_{sat}$ of the photodiode only has to meet the requirement of $A < Q_{sat} < F$. This means that a greater tolerance is allowed for variances in designing and manufacturing photodiodes and hence the manufacturing yield will be improved.

Meanwhile, the margin of the saturation charge $Q_{sat}$ for realizing $V_{FDSat} > V_{dp}$ may be widened by raising the reset voltage $V_{res}$. In other words, the margin of the saturation charge $Q_{sat}$ can be widened from interval AB to interval AE by raising the reset voltage $V_{res}$ of the floating diffusion region from $V_{res1}$ to $V_{res2}$ in FIG. 5. Then, however, the supply voltage has to be raised at least by more than 5 volt. This entails a higher power consumption rate and the need of arranging an additional power source for the sensor chip along with other problems that can degrade the performance of the chip.

Embodiment 2

Now, another embodiment of the present invention will be described by referring to FIGS. 6, 7 and 8.

Figure 6:
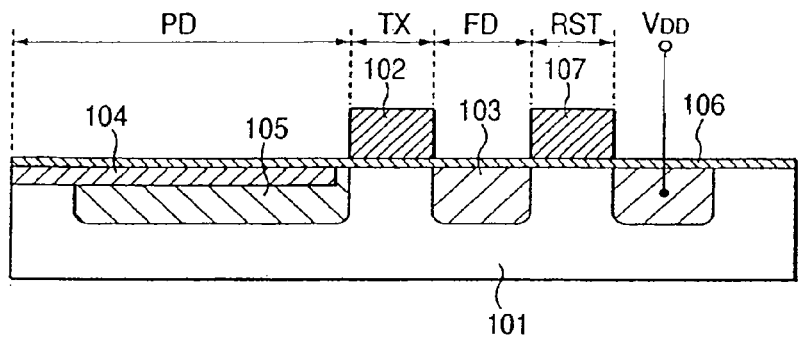
FIG. 6 is a schematic cross sectional view of a principal portion of another preferred embodiment of solid-state image pickup device according to the invention.

FIG. 6 is a schematic cross sectional view of the second embodiment of solid-state image pickup device according to the invention. FIG. 7 is a schematic illustration of changes that can take place in the potential profiles of principal sections of the embodiment of solid-state image pickup device of FIG. 6. FIG. 8 is a drive timing chart illustrating the operation of the preferred embodiment of solid-state image pickup device of FIG. 6. Note that the embodiment of solid-state image pickup device of FIG. 6 has a basic circuit configuration same as the embodiment of FIG. 1.

Referring to FIG. 6, the photodiode of the photoelectric converter of this embodiment is a buried type photodiode comprising a P-type well 101 formed in the substrate surface, a N-type region 105 and a surface p-region 104. As described above, with a buried type photodiode, the dark current that can be generated at the interface with the oxide film 106 of $SiO_2$ can be suppressed by arranging a p$^+$-layer containing an impurity to a high concentration level at the surface. Additionally, the saturation charge of the photodiode can be raised by the junction capacitance generated between the n-layer of the storage section and the p$^+$-layer of the surface. In FIG. 6, there are also shown the gate electrode 102 of transfer switch Q1, an n-type semiconductor region 103 which will operate as floating diffusion region FD and the gate electrode 107 of reset switch Q2.

Figure 7:
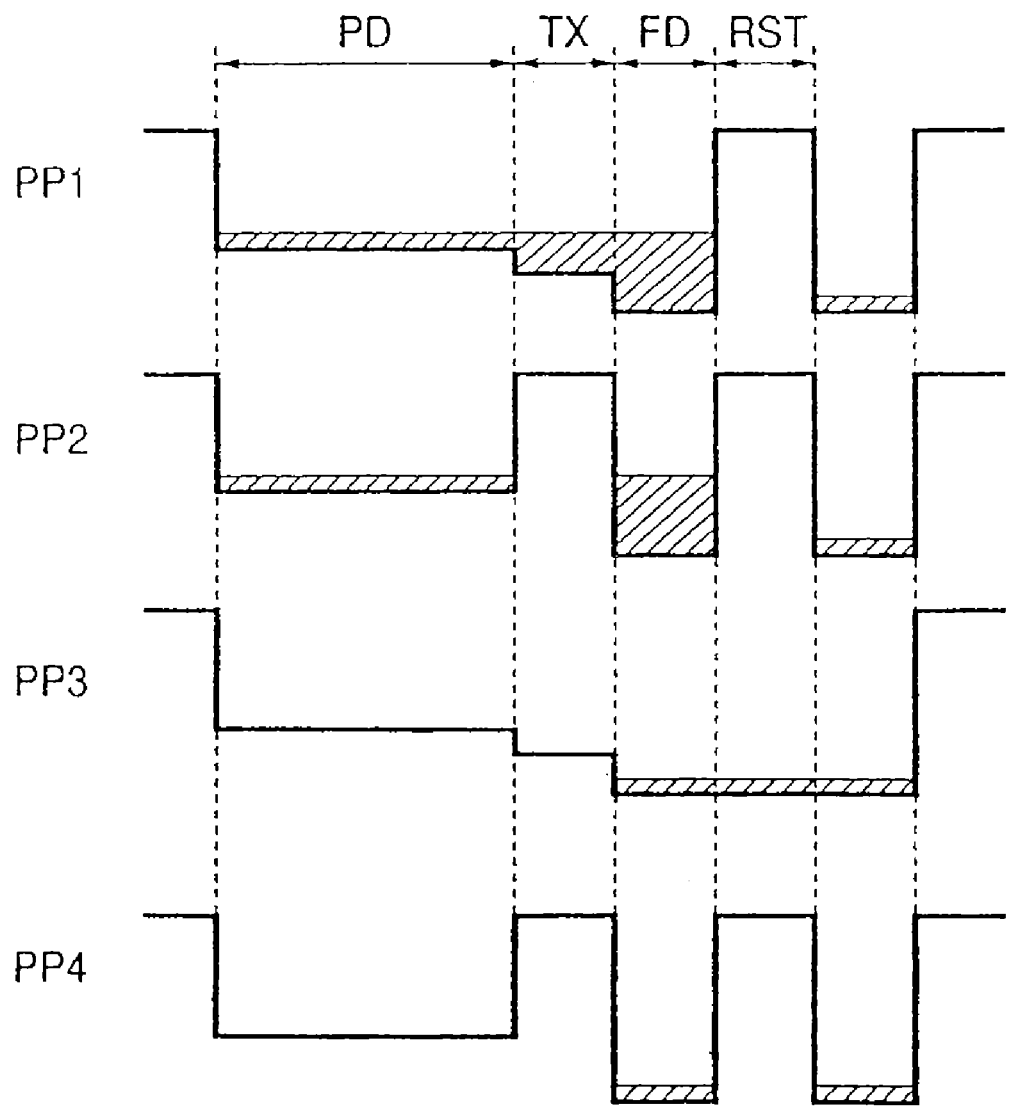
FIG. 7 is a schematic illustration of changes that can take place in the potential profiles of principal sections of the preferred embodiment of solid-state image pickup device according to the invention.

FIG. 7 illustrates changes of potential profile, and PD denotes the photodiode, while TX denotes the portion under the gate of the transfer switch and RST denotes the portion under the gate of the reset switch.

The embodiment of solid-state image pickup device operates in a manner as described below.

Figure 8:
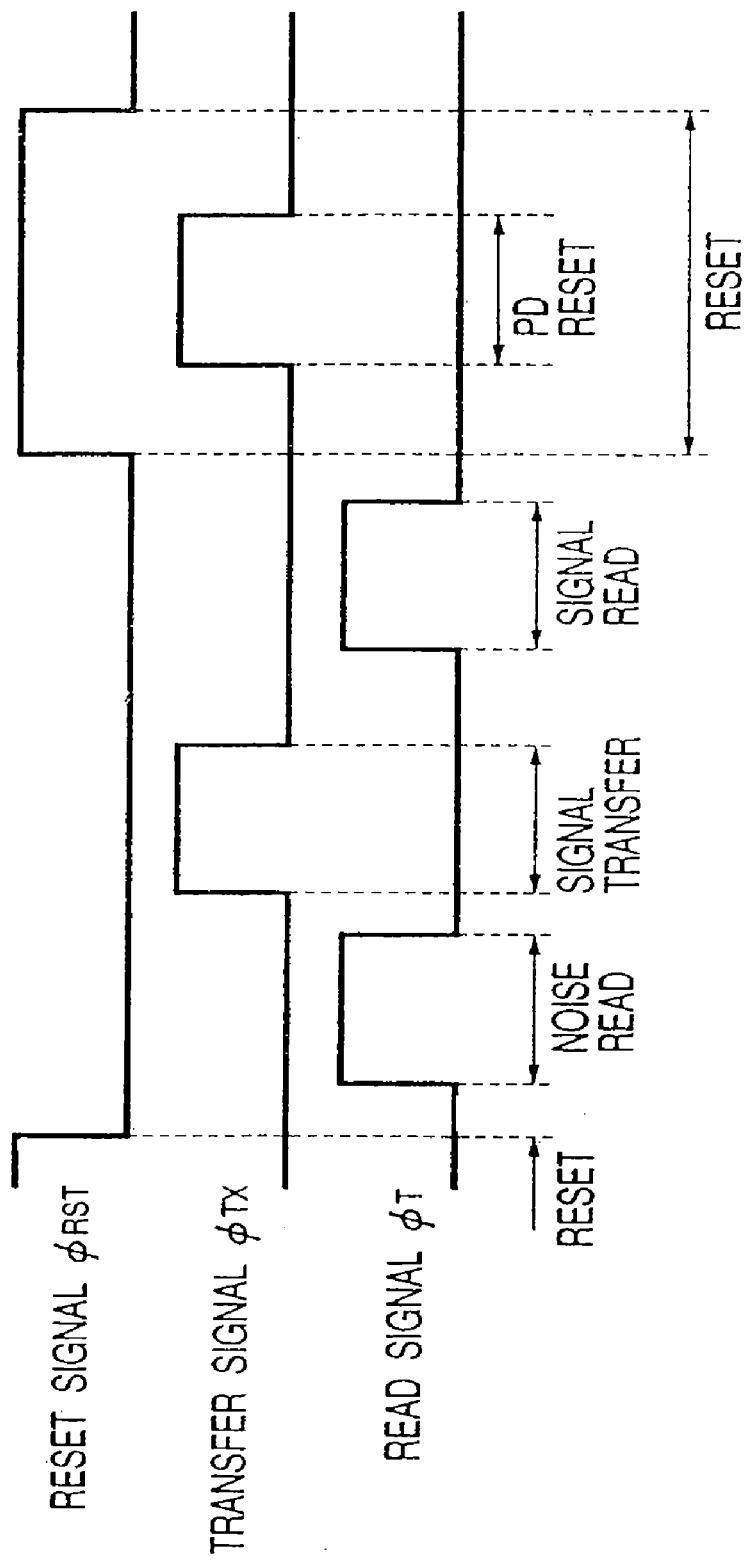
FIG. 8 is a drive timing chart illustrating the operation of the preferred embodiment of solid-state image pickup device according to the invention.

Referring to FIG. 8, after the photodiode and the floating diffusion region 103 are reset, the noise is read out from output terminal Vout by means of a read circuit as shown in FIG. 1.

Then, as shown in FIG. 8, the transfer switch Q1 is turned on by applying a high level signal (transfer signal φTX) to the gate 102 of the transfer switch Q1 and the optical signal charge stored in the photodiode is read out to the floating diffusion region 103 (FD) by way of the transfer switch. PP1 in FIG. 7 shows the potential profile that will be observed at this time.

Then, as shown in FIG. 8, the transfer switch Q1 is turned off by applying a low level signal to the gate 102 of the transfer switch Q1 and the sensor signal is read out by applying a read signal to a source follower circuit. The sensor signal is read out by transforming the signal charge $Q_{sig}$ into voltage $Q_{sig}/C_{FD}$ by means of the capacitance $C_{FD}$ of the floating diffusion region FD. PP2 in FIG. 7 shows the potential profile that will be observed at this time.

Then, the reset switch Q2 is turned on by applying a high level signal (reset signal φRST) to the reset switch Q2 in order to reset the floating diffusion region 103 as shown in FIG. 8. Additionally, the transfer switch Q1 is also turned on to reset the photodiode. PP3 in FIG. 7 shows the potential profile that will be observed at this time.

Then, after turning off the transfer switch Q1, the reset switch Q2 is also turned off to terminate the resetting operation. PP4 in FIG. 7 shows the potential profile that will be observed after terminating the resetting operation.

As described above, a resetting operation can be carried out to deplete the photodiode prior to a storage operation without additionally arranging an overflow-drain element or a reset element for the photodiode, by holding the voltage of the floating diffusion region to a level that is sufficiently high for applying a reverse bias voltage higher than the depletion voltage to the photodiode before opening the transfer switch. Then, a greater tolerance is allowed for variances in manufacturing photodiodes and hence the manufacturing yield will be improved.

Embodiment 3

Figure 9:
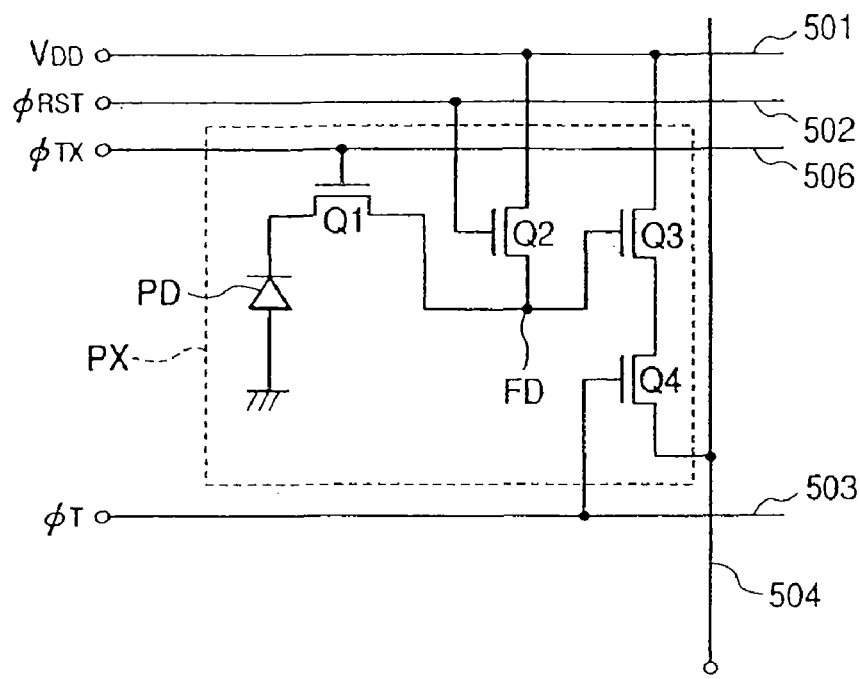
FIG. 9 is a schematic circuit diagram of a pixel of still another preferred embodiment of solid-state image pickup device according to the invention.

FIG. 9 is an equivalent circuit diagram of a pixel of the solid-state image pickup device according to the invention. In FIG. 9, the photodiode PD is a buried type photodiode as in the case of the preceding embodiments. Otherwise, there are shown a MOS transistor Q1 operating as transfer switch for transferring a photoelectric charge to floating diffusion region FD, a MOS transistor Q2 operating as reset switch for resetting the floating diffusion region FD, an input MOS transistor Q3 of a source follower for outputting the voltage of the floating diffusion region FD and a MOS transistor Q4 operating as selection switch for selecting a pixel. The input MOS transistor Q3 of the source follower takes the role of a signal amplifier and the floating diffusion region FD operates as the input terminal of this signal amplifier.

Figure 10:
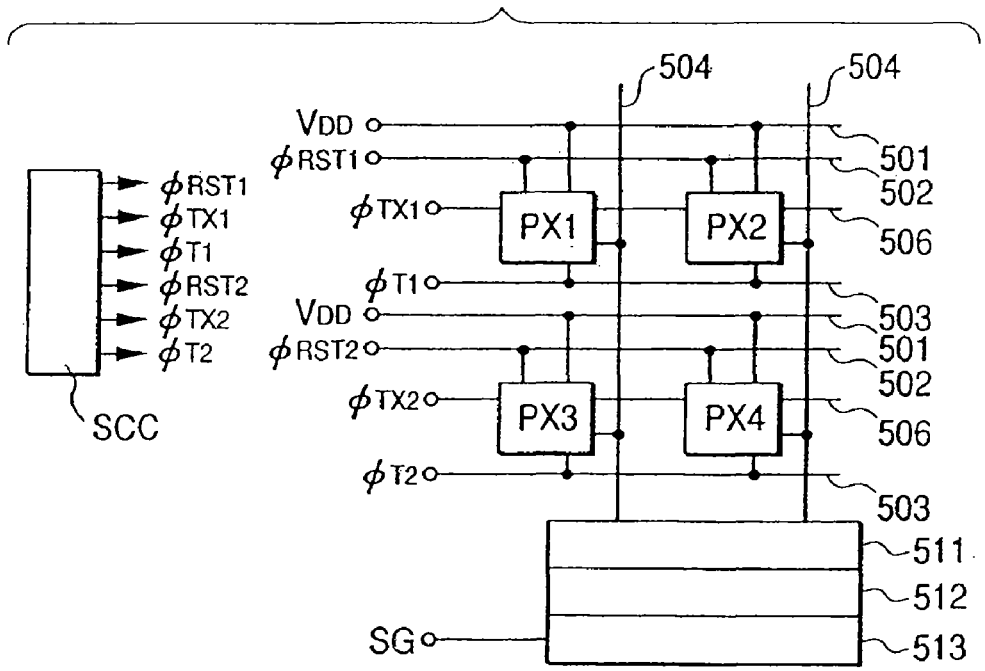
FIG. 10 is a schematic circuit diagram of the preferred embodiment of solid-state image pickup device according to the invention.

FIG. 10 is a schematic circuit diagram of a solid-state image pickup device comprising a matrix of 2×2 pixels PX, each having a circuit configuration as shown in FIG. 9.

The pixels PX1 and PX2 of the first row have a common selection signal line 503 for receiving pulse signal φT1 as input from control circuit SCC. Similarly, the pixels PX3 and PX4 of the second row have a common selection signal line 503 for receiving pulse signal φT2 as input from the control circuit SCC.

Additionally, the pixels PX1 and PX3 of the first column have a common signal output line 504, which is connected to a load array 511 and a memory 512. Similarly, the pixels PX2 and PX4 of the second column have a common signal output line 504, which is also connected to the load array 511 and the memory 512. The memory 512 has a capacitance for storing a noise component and a capacitance for storing a signal component and is adapted to store an output signal in these capacitances upon receiving a sampling pulse as input. Reset lines 502 and transfer control lines 506 are connected to the control circuit SCC so as to input a pulse signal to all the pixels or on a row by row basis in order to turn on a target transistor.

The signal read out from the memory 512 is scanned by scanning circuit 513, which may be a shift register, and output by way of output terminal SG.

FIG. 11 is a drive timing chart illustrating drive pulses to be used for reading a pixel.

Before starting a storing operation, the transfer switch Q1 is turned on by inputting a pulse φTX to the corresponding transfer control line 506 as indicated by T1, while keeping the reset switch Q2 in an on-state, to reset and deplete the photodiode.

For instance, when the voltage VDD of the power supply line 501 is 5 volts and the reset switch Q2 is on, the floating diffusion region is made to show a voltage of about 3.5 volts. The depletion voltage $V_{dp}$ of the photodiode under this condition will be about 2.5 volts. As the photodiode is reset, the inside of the photodiode will be depleted. The depleted condition of the photodiode can be evidenced by means of a residual image experiment.

Subsequently, a signal is stored for 1/30 seconds. The reset switch Q2 is held on mostly during the signal storing period. Thereafter, the reset switch Q2 is turned off by applying a pulse as indicated by T3 to bring the diffusion region FD into a floating state. Then, the selection switch Q4 is turned on to read out the stored signal by applying a pulse as indicated by T4. Thus, the voltage corresponding to the voltage of the floating diffusion region is output from the corresponding signal output line 504 by means of the source follower comprising the load array 511 connected to the MOS transistor Q3 and the corresponding signal output line 504. This output is sampled by the memory 512.

In this instance, the noise component of the pixel can be read out by turning off the reset switch Q2 from an on-state and subsequently turning on the selection switch Q4 while keeping the transfer switch Q1 in an off-state during the reading period TR. For this purpose, the noise component is stored in the noise storage capacitance of the memory 512 by means of a sampling pulse T5. After turning on the transfer switch Q1 by means of a pulse T6, the signal component is stored in the signal storage capacitance of the memory 512 by applying a sampling pulse T7 also during the reading period.

Then, an output signal with a reduce noise level can be obtained by outputting the difference of the signal component and the noise component obtained in this way by means of a subtracter, which is typically a differential amplifier.

Since the diffusion region FD is in a floating state when sampling the signal component, the voltage $V_{FD}$ of the diffusion region FD is expressed by subtracting $Q/C_{FD}$ from the reset voltage $V_{res}$, or $V_{FD}=V_{res}-Q/C_{FD}$ (where Q is the transferred electric charge).

A signal corresponding to the voltage is output from the signal output line 504 and sampled.

Then, the inside of the photodiode is depleted before entering a subsequent storage period by turning on the reset switch Q2 and opening the transfer switch Q1 by means of a pulse T2.

In an experiment, the photoelectric conversion performance of the embodiment was evaluated by using the signal obtained as a result of the above operation to evidence a good linearity of the performance. The voltage of the floating diffusion region fell to 1.5 volts when the output was saturated.

For the purpose of comparison, the residual image was observed while constantly keeping the pulse φTX to the transfer switch Q1 at a low level to find a residual image of about 20 to 30%.

Table below summarily shows the obtained results.

|  | light | dark | |
| --- | --- | --- | --- |
|  | 1$^{st}$ output | 2$^{nd}$ output | 3$^{rd}$ output |
| operation for comparison | 2.0 V | 0.45 V | 0.2 mV or less |
| operation of embodiment | 2.0 V | 0.2 mV or less | 0.2 mV or less |

Embodiment 4

An operation of the embodiment of solid-state image pickup device as shown in FIG. 10 using another drive timing chart will be discussed below, although the reset phase of this operation is same as the above described one.

While FIG. 10 shows a matrix of 2×2 pixels, FIG. 12 shows a drive timing chart for the pixels of given three rows of a matrix having three or more than three rows.

In FIG. 12, each of the periods 7a, 7b and 7c correspond to the reading period TR in FIG. 11. On the other hand, periods 7A, 7B and 7C are horizontal scanning periods of sequentially outputting the signals of the respective rows stored in the memory 512 on a time series basis by means of scanning circuit 513. More specifically, in the reading period 7a, the signals of the pixels of the (n−1)-th row ares read out and written in the line memory 512 for the row as the noise component and the optical signal component. Then, in the horizontal scanning period 7A, the signals written in the line memory 512 are sequentially read out on a time series basis. All the photodiodes are storing signals at least during the horizontal scanning period 7A. Subsequently, the signals of the pixels of the n-th row are read out in the reading period 7b and the signals in the line memory 512 are read out in the horizontal scanning period 7B. Thus, the operation of reading out the signals from the pixels and then from the line memory is conducted on a row by row basis in a rolling shutter mode. As a result, an excellent moving image that is free from any residual image can be retrieved.

Embodiment 5

FIG. 13 is a schematic illustration of an image input apparatus realized by using a solid-state image pickup device 1 according to the invention. The apparatus comprises an optical system 3 such as a lens and a mechanical shutter 2 and the exposure time (storage time) of the solid-state image pickup device 1 is controlled by the shutter 2. The reset operation of the solid-state image pickup device 1 proceeds in a manner as described above.

Figure 14:
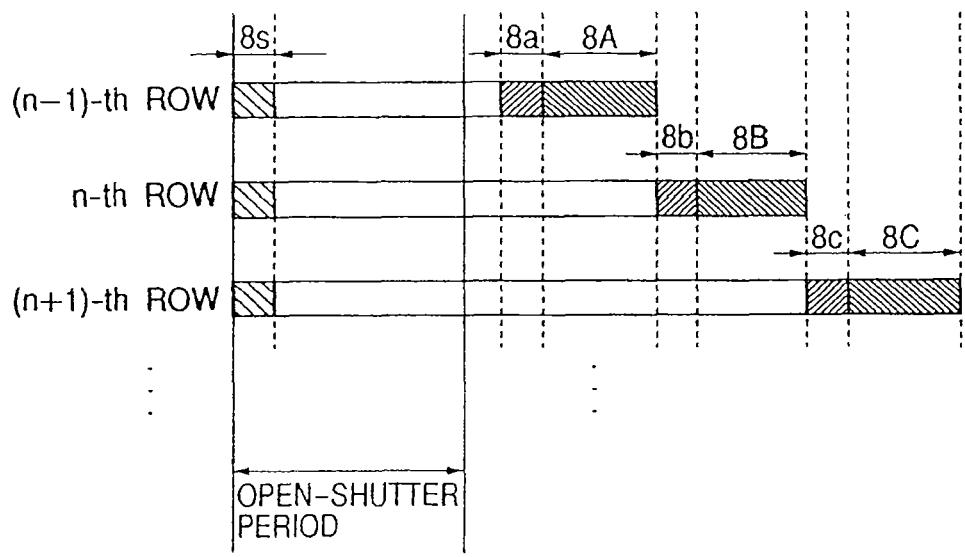
FIG. 14 is a drive timing chart illustrating the operation of the image input apparatus.

The image input apparatus operates in a manner as described below with referring to FIG. 14.

The photodiodes of the solid-state image pickup device 1 are reset in the initial reset period 8s of the overall openshutter interval to eliminate all the signals that may have been stored there. Then, signals are stored and the shutter is closed after a predetermined period of time. Then, the signals of the pixels of the (n−1)-th row are read out to the line memory 512 in the reading period 8b and subsequently the signals held in the line memory 512 are sequentially read out by means of the scanning circuit 513 in the horizontal scanning period 8B. Thereafter, the signals of the pixels of the n-th row are read out to the line memory in the reading period 8a and subsequently the signals held in the line memory 512 are sequentially read out by means of the scanning circuit 513 in the horizontal scanning period 8A. A similar operation will be repeated to read out the signals from the pixels of all the rows. This technique is particularly adapted to picking up a still image because all the pixels are provided with a same and unique storage time.

Embodiment 6

Figure 15:
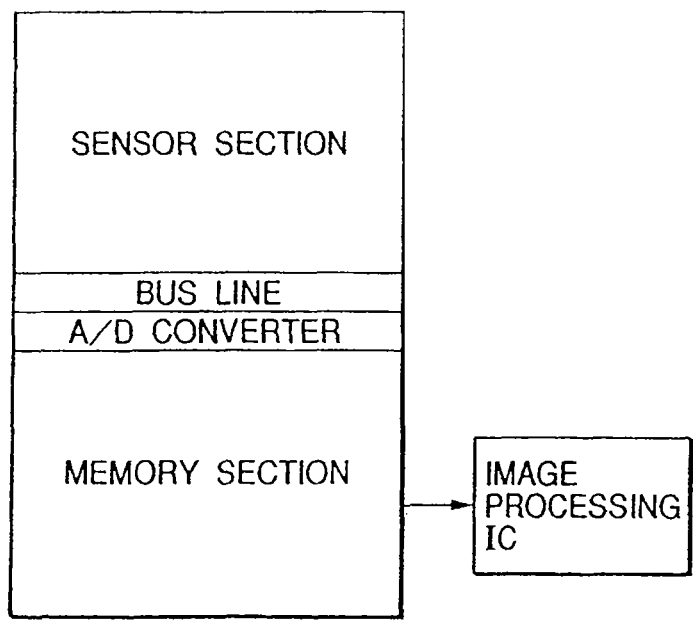
FIG. 15 is a schematic circuit diagram of still another preferred embodiment of solid-state image pickup device according to the invention.

FIG. 15 is a schematic illustration of a still another embodiment of solid-state image pickup device comprising a sensor section containing pixels arranged to form a matrix, a bus line for transmitting the signals from the sensor section to an A/D converter and a memory section for storing the A/D converted signals read out from all the pixels.

Figure 16:
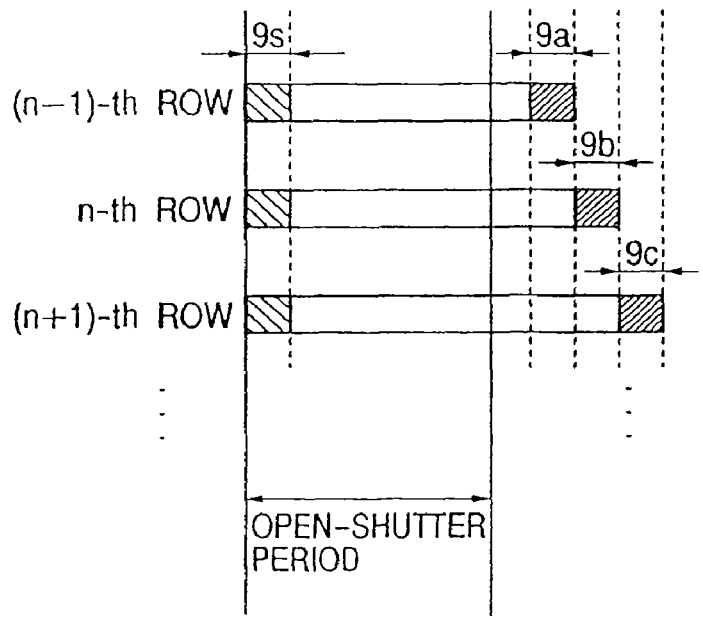
FIG. 16 is a drive timing chart illustrating the operation of the preferred embodiment of solid-state image pickup device according to the invention.

FIG. 16 is a drive timing chart illustrating the operation of the solid-state image pickup device of FIG. 15. The reset operation of the solid-state image pickup device 1 proceeds in a manner as described above.

Referring to FIG. 16, all the pixels are reset in the reset period 9s.

After a predetermined storage time, the mechanical shutter 2 is closed to terminate the operation of storing optical signals.

Then, in the reading period 9a, the signals of the (n−1)-th row are read out and input to the A/D converter by way of the bus line. Thus, the analog signals converted into digital signals, which are then written in the respective positions of the memory section having the predetermined respective addresses.

Subsequently, in the reading period 9b, the signals of the n-th row are read out, A/D converted and written in the respective positions of the memory section having the predetermined respective addresses.

Then, in the reading period 9c, the (n+1)-th row are read out and written in the respective positions of the memory section having the predetermined respective addresses.

In this way, signals are stored after resetting all the photodiodes and the signals of each row are read out and input to the A/D converter by way of the bus line. Then, the image signals digitized by the A/D converter are written in the memory cells prepared for the respective pixels. Thus, the solid-state image pickup device according to the invention is adapted to pickup an image regardless if the image is a moving image or a still image. Particularly, in the case of a moving image, the immediately preceding image can be processed by means of a image processing IC during the storage period of the current image.

Embodiment 7

Figure 17:
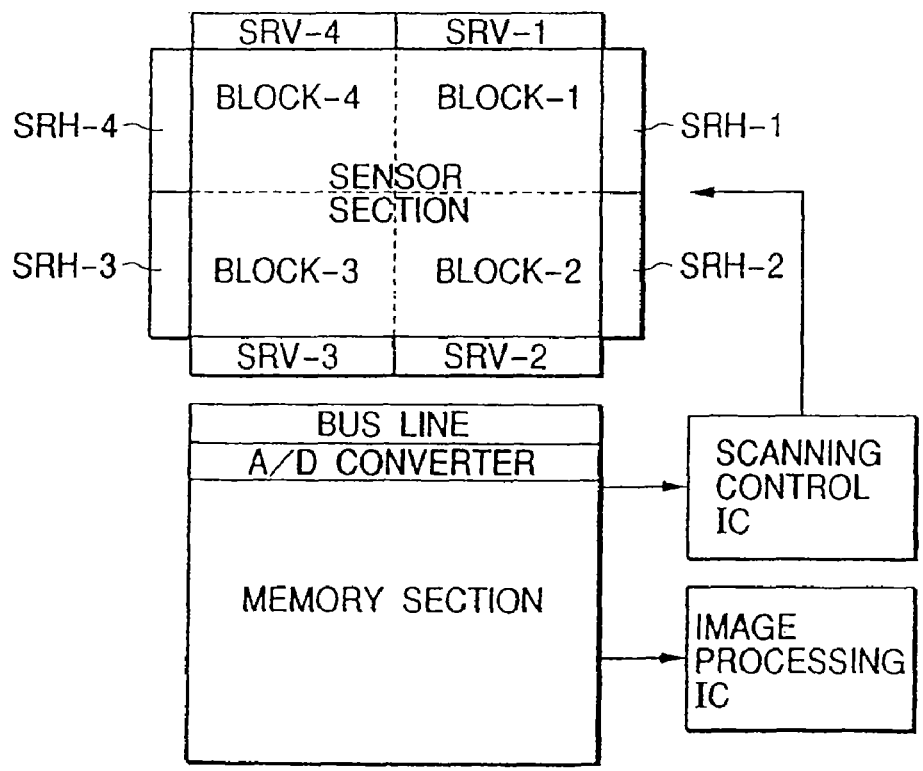
FIG. 17 is a schematic circuit diagram of still another preferred embodiment of solid-state image pickup device according to the invention.

FIG. 17 is a schematic illustration of still another embodiment of solid-state image pickup device according to the invention.

The sensor section of this embodiment is divided into four blocks, which are provided with respective horizontal and vertical scanning selection circuits.

Each scanning selection circuit can be used to select a row and a column under the control of a scanning control IC with an independent timing.

The read out pixel signals are subjected to A/D conversion and the digitized signals are written in the memory section.

With this embodiment, the storage time of the current frame can be determined on a row by row basis according to the image signals of the immediately preceding frame.

Figure 18:
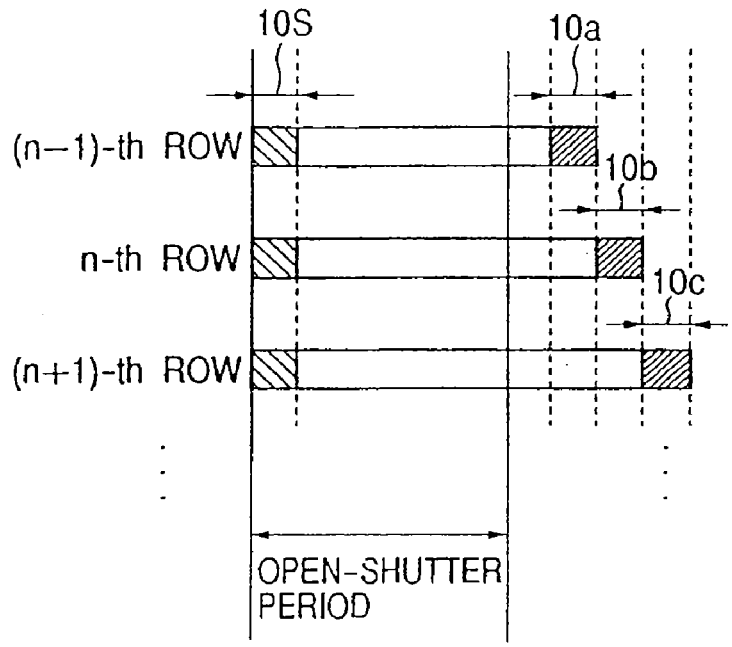
FIG. 18 is a drive timing chart illustrating the operation of the preferred embodiment of solid-state image pickup device according to the invention.
Figure 19:
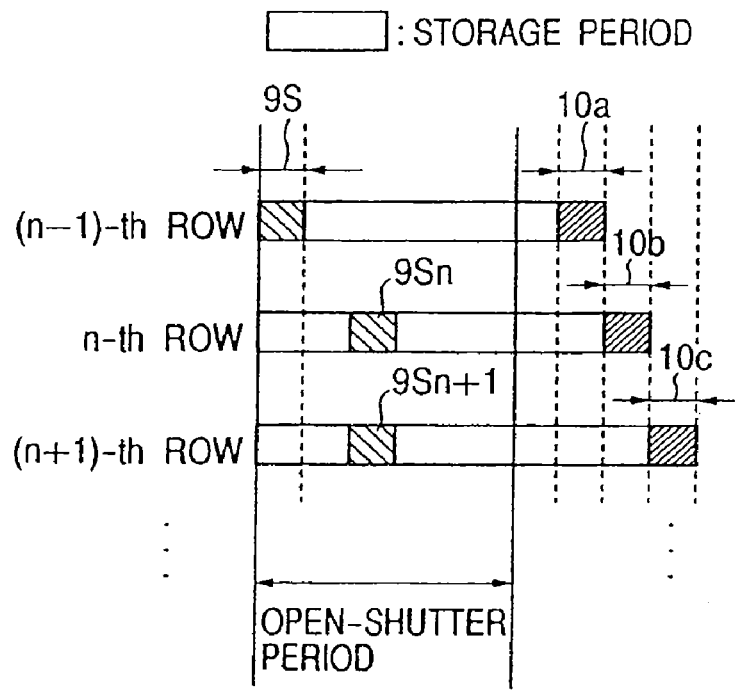
FIG. 19 is another drive timing chart that can be used for the operation of the preferred embodiment of solid-state image pickup device according to the invention.

For example, as shown in FIG. 18, the photodiodes are reset in the reset period 10S for the first frame and then a storage operation is started. Subsequently, signals are sequentially read out on a row by row basis in the reading periods 10a through 10c and written in the memory section.

If signals that can be regarded as saturated signals are found in the image signals stored in the memory section, the storage period of the next frame can be altered by shifting the timing of starting the reset period.

For example, when the reset period is started at a time for all the rows and some of the signals from the pixels of the n-th row and those from the pixels of the (n+1)-th row are saturated, the storage period of the n-th row and the (n+1)-th row are shortened by forwardly shifting the reset periods 9Sn and 9Sn+1 on the basis of the judgment of the scanning control IC.

Figure 20:
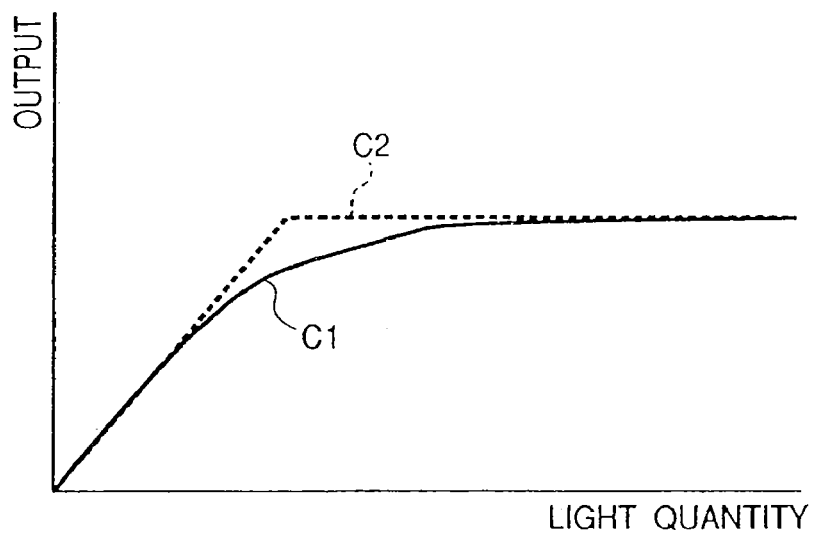
FIG. 20 is a graph illustrating the dependency of the output of the preferred embodiment of solid-state image pickup device according to the invention on the quantity of incident light.

In this embodiment, a relationship between the quantity of light and the sensor output as indicated by C1 in FIG. 20 is obtained by controlling the storage period by means of the scanning control IC. More specifically, the operation of the photodiodes of this embodiment is shifted forwardly from the end of the reset operation of the (n−1)-th row to reduce the storage period of the n-th row and that of the (n+1)-th row to about ½ of that of the (n−1)-th row. As a result, a phenomenon of saturated output that otherwise occurs as indicated by C2 in FIG. 20 if the reset period is started at a time for all the rows can be avoided and the output will show a curve C1, representing an excellent tone, even when the quantity of light entering the solid-state image pickup device is more than doubled from the ordinary level.

Embodiment 8

Figure 21:
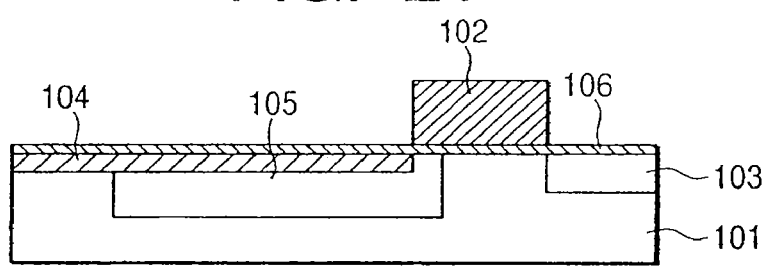
FIG. 21 is a schematic cross sectional view of a principal portion of the preferred embodiment of solid-state image pickup device according to the invention.

This embodiment is adapted to prevent the blooming phenomenon from taking place by holding the voltage applied to the transfer gate to a predetermined level so that the electric charge stored in the photodiodes during the storage period may partly flow out to the diffusion region FD that is held to the reset potential. FIG. 21 is a schematic cross sectional view of a principal portion of this embodiment of solid-state image pickup device.

Figure 22:
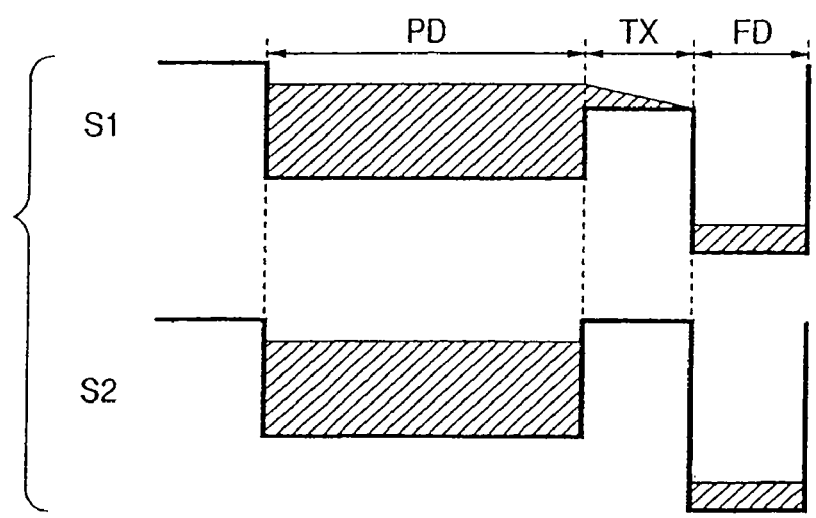
FIG. 22 is a schematic illustration of changes that can take place in the potential profiles of principal sections of the preferred embodiment of solid-state image pickup device according to the invention.
Figure 23:
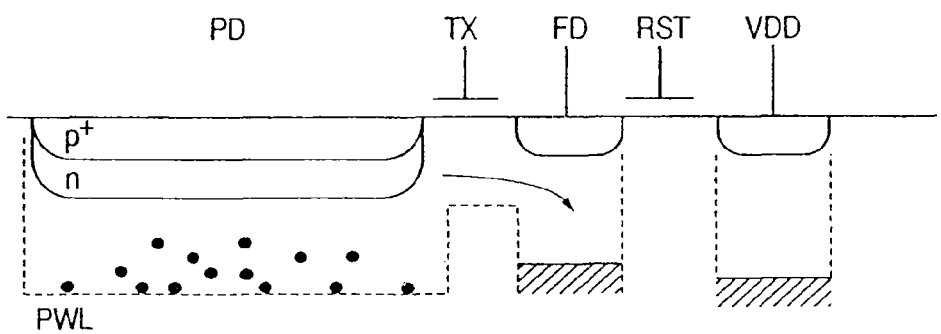
FIG. 23 is a schematic cross sectional view of the preferred embodiment of solid-state image pickup device according to the invention, illustrating a depletion transfer thereof.
Figure 24:
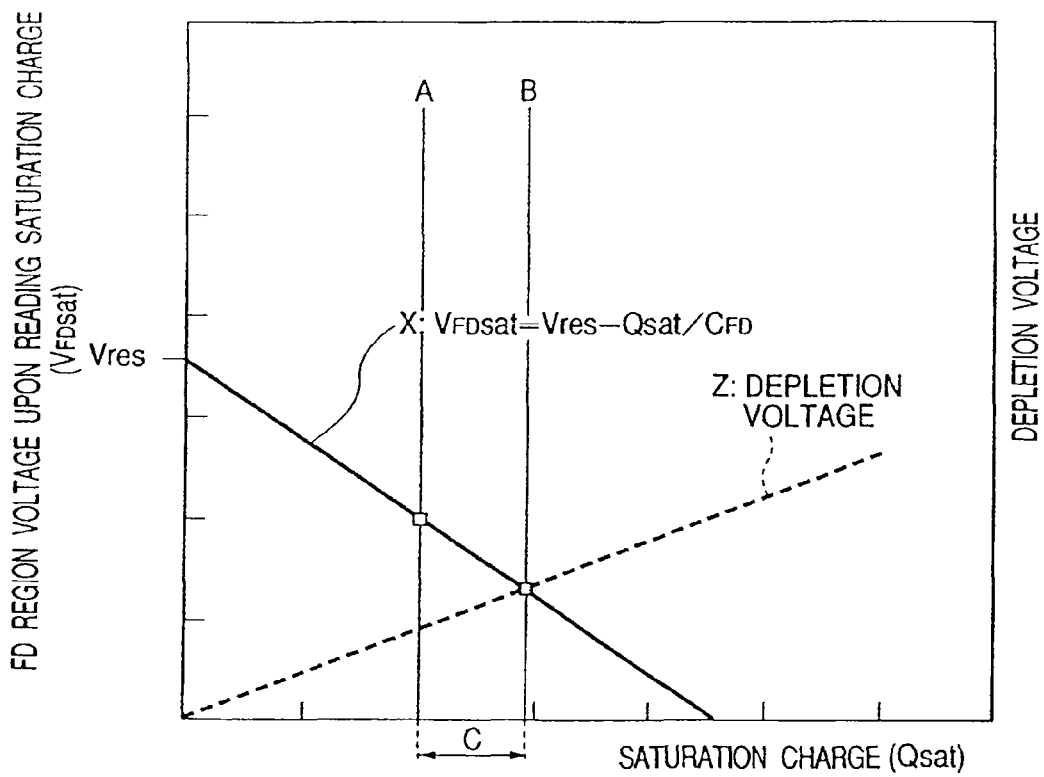
FIG. 24 is a graph illustrating the dependency of the voltage necessary for depletion transfer on the saturation charge of the preferred embodiment of solid-state image pickup device according to the invention.

For example, the potential barrier of the transfer gate TX is lowered slightly as indicated by S1 in FIG. 22 to make any excessive electric charge to flow into the diffusion region FD by raising the voltage of the low level pulse of φTX in FIG. 2 from the voltage of the P-type well 101.

To be more accurate, while the LOW level of the MOS transistor Q1 of the transfer switch shown in FIG. 2 or FIG. 11 is equal to the ground level, the LOW level of the MOS transistor Q1 of the embodiment is raised by 0.3 volt from the ground level. As a result, the potential profile of the photodiodes and the transfer switch will be like the one indicated by S1 in FIG. 22. Note that S2 in FIG. 22 indicates the corresponding potential profile when the LOW level is made equal to the GND level (0 volt).

In this embodiment, the low potential portion of the MOS transistor Q1 is made to operate as the channel section TX of the transfer switch and the transfer switch itself is made to operate as a horizontal type overflow drain by raising the LOW level of the MOS transistor Q1. In other words, the transfer switch is made to operate as a horizontal type overflow drain by holding the potential of the diffusion region to a fixed level during the storage period and controlling the gate voltage of the transfer switch so as to make it half open. As a result, any cross talk can be effectively suppressed.

As described above in detail, with any of the embodiments of the invention, the transfer switch can be opened by holding the floating diffusion region to a voltage level with which a reverse bias voltage higher than the depletion voltage can be applied before the start of the next storage period. Thus, any residual electric charge remaining in the photoelectric converter can be eliminated to reset the latter so as to provide the advantages as listed below.

(1) Any transfer residue attributable to variances in the electric charge of the photodiodes that are brought in by the variances of the products can be eliminated after the transfer operation.

(2) A solid-state image pickup device that is free from any residual image can be provided without raising the power supply voltage and increasing the pixel size.

Meanwhile, Japanese Patent Publication No. 7-105915 described a method of resetting a photodiode by using a switch element arranged separately. However, the disclosed technique does not provide any appropriate way for reducing the pixel size.

With the technique disclosed in the above patent document, the photodiode is arranged within a well and shows a simple PN junction with a high concentration impurity region of the type opposite to that of the well. Such an arrangement, however, entails a large reset noise that is a function of the junction capacitance of the photodiode if the photodiode is reset. To the contrary, with a method of resetting a solid-state image pickup device according to the invention, the device is reset by depleting each of the photodiodes and the reset noise is, if any, negligible.

There are CCDs having an overflow drain function of using a vertical type overflow drain and a collective reset function of resetting all the pixels collectively. While such a device is adapted to deplete the buried type photodiodes for resetting as in the case of a solid-state image pickup device according to the invention, a vertical type overflow drain has a device structure that is totally different from a surface device such as a MOS transistor and extends downwardly. Therefore, although it does not occupy the pixel area, it cannot downwardly control the profile of the impurity. Additionally, such a device can only reset the pixels collectively.

To the contrary, with a solid-state image pickup device according to the invention, the transfer switch can be made to operate as a horizontal type overflow drain by holding the potential of the diffusion region to a fixed level during the storage period and controlling the gate voltage of the transfer switch so as to make it half open. Thus, a solid-state image pickup device according to the invention does not need to comprise a vertical type overflow drain that can be prepared only with difficulty nor a horizontal type overflow drain that obstructs the effort of reducing the pixel size. Therefore, a solid-state image pickup device according to the invention is particularly adapted to reducing the pixel size.

Additionally, a solid-state image pickup device according to the invention is adapted to carry out a so-called rolling shutter operation by resetting the photodiodes by means of the transfer switch after reading the signals to the floating diffusion region on a row by row basis.

Still additionally, the photodiode of any selected pixel can be reset by arranging a decoder in the scanning section of the control electrode of the transfer switch.

On the other hand, the transfer switch can be opened for all the pixels by holding the floating diffusion region to a voltage level with which a reverse bias voltage higher than the depletion voltage can be applied. With such an arrangement, the transfer switch can be used as the electronic shutter of an electric still camera.

As described above, according to the invention, since the transfer switch can be opened while holding the floating diffusion region to a voltage level so that a reverse bias voltage higher than the depletion voltage can be applied, it is possible to carry out a resetting operation of depleting the photoelectric converter prior to the storage period. This means that a greater tolerance is allowed for variances in designing and manufacturing solid-state image pickup images and hence the manufacturing yield will be improved.

Finally, according to the invention, any residual signal charge can be eliminated at the time of resetting operation under a condition where all the electric charge cannot be transferred in the reading period.

What is claimed is:

1. A solid-state image pickup device comprising a plurality of pixels arranged two-dimensionally and being provided with, for each pixel, a photoelectric converter, a signal amplifier with an input section therefor, a transfer switch for transferring an electric charge from the photoelectric converter to the input section, and a reset switch for applying a reset voltage to the input section, wherein the device is adapted to operate, for each pixel, such that:

the reset switch and the transfer switch are turned on together at least in a predetermined first reset period to reset an electric charge at the photoelectric converter;

then the transfer switch are turned off to store a photoelectric charge in the photoelectric converter for a predetermined storage period;

then the reset switch is turned off to read out a noise component from the signal amplifier;

subsequently the transfer switch is turned on at least in a predetermined transfer period while the reset switch is held in a off state to read out a light signal based on the photoelectric charge stored in the photoelectric converter from the signal amplifier; and thereafter the reset switch and the transfer switch are turned on together at least in a predetermined second reset period to reset an electric charge at the photoelectric converter and wherein the device is adapted to operate such that:

electric charges at the photoelectric converters of the pixels in plural pixel rows are reset at a time in the first reset period; and electric charges at the photoelectric converters of the pixels in a pixel row are reset at a time in the second reset period.

2. A solid-state image pickup device according to claim 1, wherein the device further comprises an A/D converter for converting an input signal read out from a pixel and a memory cell for writing a digital signal converted by the A/D converter.

3. A solid-state image pickup device according to claim 2, wherein the memory cell is provided for each pixel.

* * * * *